United States Patent [19]
Nath

[11] 3,856,698

[45] Dec. 24, 1974

[54] PREPARATION OF RARE-EARTH OXYSULFIDE LUMINESCENT MATERIAL

[75] Inventor: Dilip K. Nath, Mayfield, Ohio

[73] Assignee: General Electric Company, Schenectady, N.Y.

[22] Filed: June 16, 1972

[21] Appl. No.: 263,418

[52] U.S. Cl. .......................................... 252/301.4 S
[51] Int. Cl. .............................................. C09k 1/14
[58] Field of Search ............... 252/301.4 S; 423/263

[56] References Cited
UNITED STATES PATENTS

| | | | |
|---|---|---|---|
| 3,502,590 | 3/1970 | Royce et al. | 252/301.4 S |
| 3,515,675 | 6/1970 | Byler et al. | 252/301.4 S |
| 3,541,022 | 11/1970 | Hewes | 252/301.4 S |
| 3,562,174 | 2/1971 | Schuil | 252/301.4 S |
| 3,563,909 | 2/1971 | Schuil et al. | 252/301.4 S |
| 3,647,707 | 3/1972 | Gillooly et al. | 252/301.4 S |

FOREIGN PATENTS OR APPLICATIONS

| | | | |
|---|---|---|---|
| 1,243,326 | 8/1971 | Great Britain | 252/301.4 S |

*Primary Examiner*—Jack Cooper
*Attorney, Agent, or Firm*—John F. McDevitt; Henry P. Truesdell; Frank L. Neuhauser

[57] ABSTRACT

Rare-earth oxide mixtures are converted to rareearth oxysulfide luminescent material with $H_2S$ gas by heating in liquid $Na_2S$ or other alkali metal sulfides further containing a sulfur compound which generates $SO_2$ at the conversion temperatures and thereafter said luminescent material is recrystallized by further heating in a neutral atmosphere.

7 Claims, No Drawings

PREPARATION OF RARE-EARTH OXYSULFIDE LUMINESCENT MATERIAL

BACKGROUND OF THE INVENTION

The present invention relates to a process for preparing improved luminescent materials. More particularly, it relates to a process of preparing a rare-earth oxysulfide luminescent material by converting rare-earth oxide mixtures through reaction with $H_2S$ gas in a particular liquid fluxing medium and thereafter recrystallizing said luminescent material in the same fluxing medium under different heating conditions to provide a product have improved operating characteristics.

Rare-earth oxysulfide luminescent materials such as $Y_2O_2S$:Eu (yttrium oxysulfide activated with europium) have previously been produced by various processes, and, generally, by single-step processes. For instance, compounds of the constituent materials have been mixed together with mineralizing agents such as other compounds which produce an alkali metal sulfide and a polysulfide upon heating. Specifically, such mineralizing agents have included alkali thiosulfate and a mixture of sulfur and alkali carbonate. However, the processes of the prior art have tended to produce $Y_2O_2S$:Eu mixed with a variety of residual compounds, some of which are deleterious, and none of which are desired, being at least wasteful diluents. Also, these undesired reaction products are often difficult to remove from the luminescent material or phospor. Particularly, undesirable contaminants include unreacted $Y_2O_3$, $Y_2S_3$, $NaYS_2$, and polymeric sulfides of sodium.

A more recently discovered process which is described in U.S. Pat. No. 3,647,707, issued Mar. 7, 1972 in the names of George G. Gillooly and Jacob G. Rabatin, and assigned to the assignee of the present invention, discloses a method to recrystallize $Y_2O_2S$:Eu or related luminescent materials in liquid $Na_2S$ or other alkali metal sulfides to increase particle size and improve the crystallinity and light production of the luminescent materials. The luminescent material is preferably prepared by firing europium-containing $Y_2O_3$ or related oxides in $H_2S$ gas. While gaseous hydrogen sulfide has proven to be an improved sulfurizing agent in the particular method described, there has also been difficulty in avoiding completely the phenomena of partial reduction of the rare-earth ions to a lower valency state or the formation of trace amounts of sesquisulfides or other contaminant compounds such as alkali rare-earth sulfides when an alkali metal sulfide is subsequently used as a liquid medium in which to recrystallize the rare-earth oxysulfide.

Consequently, the prior art processes have not resulted in the desired degree of crystallinity or large enough phosphor particles having the correct composition and being contaminant-free for optimum application. It would be of considerable benefit, therefore, to provide a novel method of preparation for crystalline rare-earth oxysulfide luminescent materials whereby full conversion of rare-earth oxides to oxysulfides is achieved with minimum occurrence of any undesirable side reactions mentioned while, at the same time, crystallizing the luminescent material in a single-step operation.

SUMMARY OF THE INVENTION

It is an object of the present invention to provide a process for improving the preparation of crystalline rare-earth oxysulfide luminescent materials. A further object is to provide a novel process whereby rare-earth oxides are converted to the oxysulfides of luminescent grade and a phosphor product thereafter recrystallized from the same liquid fluxing medium in a continuous manner.

Briefly stated, the present invention provides a process for heating a rare-earth oxide mixture with $H_2S$ gas in a liquid fluxing medium containing an alkali metal sulfide with a sulfur compound which generates $SO_2$ until the oxysulfide material is formed and then recrystallizes the oxysulfide material in the same liquid fluxing medium by heating in a neutral atmosphere. In certain of its preferred embodiments, the oxysulfides of yttrium, gadolinium, lanthanum and lutetium are prepared with europium and/or terbium as the activators. The rare-earth oxide mixture is prepared in the preferred embodiments by heating a mixture of rare-earth compounds in the stoichiometric proportions needed for activation of the luminescent material under oxidizing conditions. Said rare-earth oxide mixture is thereafter mixed with the constituents forming the present fluxing medium to form a blended product which is heated to elevated temperatures in the range from about 700°C to about 1000°C in a gaseous atmosphere of $H_2S$ until the oxysulfide material is formed. Continued heating of the blended product containing the oxysulfide phosphor material is then conducted in a neutral atmosphere obtained by discontinuation of the $H_2S$ gas at more elevated temperatures in the range from about 1000°C to 1300°C until the oxysulfide material has been recrystallized.

DESCRIPTION OF THE PREFERRED EMBODIMENTS

In the present invention, a mixture of an alkali metal sulfide including $Na_2S$, $Li_2S$ and $K_2S$ and mixtures thereof with a sulfur compound which can be decomposed by heating to generate $SO_2$ such as an alkali metal sulfite is used in molten form as a bath to chemically convert a rare-earth oxide mixture to form the oxysulfide luminescent material and thereafter recrystallize the oxysulfide luminescent material therein so produced. The proportion of sulfur compound used to generate $SO_2$ during the chemical conversion is selected to lower the reducing conditions otherwise obtained by use of $H_2S$ gas and thereby inhibit formation of contaminant side products in the oxysulfide luminescent material. Said in another way, a sulfur compound such as sodium sulfite is employed in the liquid fluxing medium at quantities sufficient to decompose slowly at the elevated oxysulfide formation temperatures where the undesirable side reactions proceed in order to generate enough $SO_2$ sufficient to inhibit the formation of the contamination products in the oxysulfide luminescent material. In this manner, the slow generation of $SO_2$ at the conversion temperatures makes the action of $H_2S$ milder and more favorable for a complete conversion of the rare-earth oxides to the corresponding oxysulfide luminescent material without involving the undesirable side reactions to any significant extent. The subsequent recrystallization of the rare-earth oxysulfide luminescent materials including $Gd_2O_2S$:Tb, $La_2O_2S$:Eu, and $Y_2O_2S$:Eu which is accomplished by subjecting the converted oxysulfide luminescent material in the same liquid fluxing medium to different heating conditions provides an efficient technique to provide a final product having a particle size, brightness and crystallinity of optimum quality.

As in conventional phosphor nomenclature, the element or elements identified after the colon in the aboverecited chemical formulas representing the phosphor compositions of the present invention is the activator element. Unless indicated otherwise, the activator is incorporated in the host lattice in partial substitution for one of the constituents. In these cases, the rare-earth activator substitutes for proportional quantities of the rare earth of the oxysulfide host. For instance, such a phosphor containing 5% Eu as an activator would have the Eu substituted for 5% of the La. Suitable activators for various purposes for such oxysulfide phosphors can be selected from the rare earths including Dy, Er, Eu, Ho, Nd, Pr, Sm, Tb, and Tm. Activator contents, measured as x in accordance with the formula:

$$Ln_{(2-x)}Ln'_xO_2S$$

wherein Ln is one or more of Y, Gd, La, and Lu, and Ln' is one or more of Dy, Er, Eu, Ho, Nd, Pr, Sm, Tb, and Tm, can range at least from 0.0002 to 0.2 with about 0.03 to 0.05 being preferred. Because of the commercial interest in $Y_2O_2S$:Eu, detailed examples will be given of the application of the invention primarily to that phospor. The following exemplary description includes the production and recrystallization of the $Y_2O_2S$:Eu phosphor.

The oxides of yttrium and europium are slurried in water, then dissolved by addition of $HNO_3$ and boiled for several minutes. The solution is cooled to about 50°C and oxalic acid is added as a 10% aqueous solution in amounts such as 120 to 200% of the stoichiometric amount, preferably about 120%, and the reaction mixture is stirred for about 5 minutes during which time the oxalates of yttrium and europium are coprecipitated. The coprecipitated oxalates are removed by filtration, then dried at about 110°C in air and then fired to the oxide in air for about one hour at about 1100°C. This gives the mixed yttrium oxide and activator in a form suitable for use in the production of $Y_2O_2S$:Eu. More specifically, 10.80 grams of $Y_2O_3$ are dissolved with 0.79 grams of $Eu_2O_3$, coprecipitated with 22.7 grams of $H_2C_2O_4.2H_2O$, dried and fired to the oxides as described above.

A batch of 23.05 grams of the yttrium-europium oxide mixture above obtained is subsequently mixed with from 0.5 to 3 grams of sodium sulfite, preferably about one gram of sodium sulfite, and from 2.5 to 12.5 grams of 60% $Na_2S$ hydrated flake, preferably about 6.4 grams. This blended product is then heated in a current of an inert gas such as nitrogen to elevated temperatures in the range from about 700°C to 1000°C, preferably around 870°C to 900°C, for approximately one-half hour while a current of $H_2S$ gas is passed along with the flowing nitrogen. Reaction vessels can be provided made of fused silica, or, in some circumstances, preferably alumina for the conversion of the rare-earth oxide mixture to the oxysulfide luminescent material at the given reaction conditions. To recrystallize the $Y_2O_2S$:Eu material so obtained, the flow of hydrogen sulfide gas is completely stopped leaving nitrogen to flow while the temperature of the blended product now containing said luminescent material is raised to 1050° C or higher, preferably around 1150°C, with the additional heating being continued for approximately 4 to 6 hours. The fired mixture is then cooled in nitrogen, crushed, and repeatedly washed in water to remove sodium sulfide from the final product.

Similar processes can be used to prepare other embodiments of the invention.

$Li_2S$, $K_2S$, mixtures of either with each other or with $Na_2S$ along with the desirable amount of $Na_2SO_3$ which is needed to generate $SO_2$ at the conversion temperatures, can be used as a liquid fluxing medium. Additionally, a different sulfur compound to serve as the source of generating $SO_2$ in situ at the conversion temperatures can be used in the liquid fluxing medium. With these other fluxes, somewhat different temperatures for recrystallization may prove more effective. For example, 1200°C has been used successfully with $Li_2S$ and $K_2S$ containing liquid fluxing media.

For the production of oxysulfides of the other rare earths used, compounds of Gd, La, or Lu can be substituted for the compounds of Y, with appropriate adjustments known in the art being made in the weight of the ingredients to maintain the molar proportions, and similarly known adjustments can be made in the ingredients to obtain a desired activator.

What I claim as new and desire to secure by Letters Patent of the United States is:

1. A method for preparation of a crystalline rare-earth oxysulfide luminescent material having the general formula $Ln_{(2-x)}Ln'_xO_2S$ wherein Ln is one or more of Y, Gd, La and Lu, and Ln' is one or more of Dy, Er, Eu, Ho, Nd, Pr, Sm, Tb and Tm which comprises:
   a. heating a rare-earth oxide mixture with $H_2S$ gas at a temperature from about 700°C to 1000°C in a liquid fluxing medium containing an alkali metal sulfide selected from $Na_2S$, $K_2S$ and $Li_2S$ including mixtures thereof and a sufficient amount of an alkali metal sulfite compound to decompose and generate $SO_2$ during said heating until the oxysulfide material is formed, and
   b. recrystallizing the oxysulfide material in the same liquid fluxing medium by heating to a temperature of at least about 1050°C in a inert atmosphere.

2. A method as in claim 1 wherein the $H_2S$ gas is contained in an inert atmosphere.

3. A method for preparation of a crystalline rare-earth oxysulfide luminescent material having the general formula $Ln_{(2-x)}Ln'_xO_2S$ wherein Ln is one or more of Y, Gd, La and Lu, and Ln' is one or more of Dy, Er, Eu, Ho, Nd, Pr, Sm, Tb and Tm which comprises:
   a. heating a mixture of rare-earth compounds under oxidizing conditions to form a rare-earth oxide mixture,
   b. mixing said rare-earth oxide mixture with an alkali metal sulfide selected from $Na_2S$, $K_2S$ and $Li_2S$ including mixtures thereof and an alkali metal sulfite compound to form a blended product with heating said blended product withi $H_2S$ gas to elevated temperatures in the range from about 700°C to 1000°C until the oxysulfide material is formed, said sulfite compound being in a sufficient amount to decompose and generate $SO_2$ during said heating and
   c. continuing to heat the blended product in a inert atmosphere to more elevated temperatures in the range from about 1000°C to 1300°C until the oxysulfide material is recrystallized.

4. A method as in claim 3 wherein the $H_2S$ gas is contained in an inert atmosphere.

5. A method as in claim 3 in which said rare-earth oxysulfide luminescent material is $Y_2O_2S$ activated with europium.

6. A method as in claim 3 in which said alkali metal sulfide is $Na_2S$.

7. A method for preparation of crystalline $Y_2O_2S$ activated with europium which comprises:
   a. heating a mixture of $Y_2(C_2O_4)_3$ with activator amounts of $Eu_2(C_2O_4)_3$ in air to elevated temperatures in the range from about 500°C to 1000°C until the oxides are formed.
   b. mixing said oxides with $Na_2S$ and $Na_2SO_3$ to form a blended product and heating said blended product to elevated temperatures in the range from about 700°C to 1000°C while admitting a stream of $H_2S$ and $N_2$ until the $Y_2O_2S$:Eu material is formed, said $Na_2SO_3$ being in a sufficient amount to decompose and generate $SO_2$ during said heating, and
   c. continuing to heat the blended product to more elevated temperatures in the range from about 1000°C to 1300°C while admitting a stream of $N_2$ until the $Y_2O_2S$:Eu is recrystallized.

* * * * *